United States Patent
Kim et al.

(10) Patent No.: US 10,051,658 B2
(45) Date of Patent: Aug. 14, 2018

(54) APPARATUS AND METHOD FOR TRANSMITTING AND RECEIVING ENHANCED RACH IN A MOBILE COMMUNICATION SYSTEM

(75) Inventors: Young-Bum Kim, Seoul (KR); Youn-Hyoung Heo, Suwon-si (KR); Ju-Ho Lee, Suwon-si (KR); Eun-Jung Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 599 days.

(21) Appl. No.: 12/349,882

(22) Filed: Jan. 7, 2009

(65) Prior Publication Data

US 2009/0175248 A1 Jul. 9, 2009

(30) Foreign Application Priority Data

Jan. 7, 2008 (KR) .................. 10-2008-0001941
Jan. 16, 2008 (KR) .................. 10-2008-0004812

(51) Int. Cl.
*H04W 74/00* (2009.01)
*H04W 74/08* (2009.01)

(52) U.S. Cl.
CPC ..... *H04W 74/002* (2013.01); *H04W 74/0866* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 7,480,269 B2 | 1/2009 | Heo et al. | |
| 8,086,256 B2 | 12/2011 | Tajima et al. | |
| 2001/0024956 A1 | 9/2001 | You et al. | |
| 2003/0223452 A1 | 12/2003 | Toskala et al. | |
| 2007/0171889 A1 | 7/2007 | Kwon et al. | |
| 2007/0253363 A1 | 11/2007 | Bachl et al. | |
| 2008/0123585 A1 | 5/2008 | Granzow et al. | |
| 2010/0103881 A1* | 4/2010 | Roh et al. | 370/328 |

(Continued)

FOREIGN PATENT DOCUMENTS

| | | |
|---|---|---|
| CN | 1788515 | 6/2006 |
| CN | 101064908 | 10/2007 |
| EP | 2 227 924 | 2/2012 |

(Continued)

OTHER PUBLICATIONS

3rd Generation Partnership Project; Technical Specification Group Radio Access Network; Physical Layer Procedures (FDD) (Release 8), 3GPP TS 25.214 V8.0.0, Nov. 1, 2007.

(Continued)

*Primary Examiner* — Christopher Crutchfield
*Assistant Examiner* — Alan Lindenbaum
(74) *Attorney, Agent, or Firm* — The Farrell Law Firm, P.C.

(57) ABSTRACT

A method for transmitting an enhanced Random Access CHannel (RACH) in a User Equipment (UE) in a mobile communication system is provided, in which the UE transmits an uplink preamble to a Node B and upon receipt of an ACKnowledgment (ACK) for the uplink preamble, transmits an Enhanced Uplink Dedicated CHannel (E-DCH) and a Dedicated Physical Control CHannel (DPCCH) to the Node B. The transmission of the DPCCH starts before the transmission of the E-DCH.

16 Claims, 9 Drawing Sheets

(56) References Cited

U.S. PATENT DOCUMENTS

2010/0220606 A1    9/2010   Niwano
2010/0265965 A1   10/2010   Zhang et al.

FOREIGN PATENT DOCUMENTS

| JP | 2006-135992 | 5/2006 |
| JP | 2007-006080 | 1/2007 |
| KR | 1020070095583 | 10/2007 |
| WO | WO 2007/082407 | 7/2007 |
| WO | WO 2007/108097 | 9/2007 |
| WO | WO 2009/088859 | 7/2009 |

OTHER PUBLICATIONS

Nsn, Nokia, "Enhanced Random Access with E-DCH", R2-074010, 3GPP TSG-RAN WG2 Meeting #59bis, Oct. 1, 2007.
Chinese Office Action dated Aug. 28, 2012 issued in counterpart application No. 200980101532.1.

\* cited by examiner

APPARATUS AND METHOD FOR TRANSMITTING AND RECEIVING ENHANCED RACH IN A MOBILE COMMUNICATION SYSTEM

CROSS-REFERENCE TO RELATED PATENT APPLICATIONS

This application claims priority under 35 U.S.C. § 119(a) to a Korean Patent Application filed in the Korean Intellectual Property Office on Jan. 7, 2008, and assigned Serial No. 10-2008-1941, and a Korean Patent Application filed in the Korean Intellectual Property Office on Jan. 16, 2008, and assigned Serial No. 10-2008-4812, the entire disclosures of both of which are hereby incorporated by reference.

BACKGROUND OF THE INVENTION

1. Field of the Invention

The present invention relates generally to an uplink communication apparatus and method in a mobile communication system. More particularly, the present invention relates to an apparatus and method for transmitting and receiving a Random Access CHannel (RACH) in a mobile communication system.

2. Description of the Related Art

A $3^{rd}$ Generation (3G) mobile communication system that operates in Wideband Code Division Multiple Access (WCDMA) based on the European mobile communication systems, Global System for Mobile Communications (GSM) and General Packet Radio Services (GPRS), or Universal Mobile Telecommunication Service (UMTS) provides mobile users or computer users all around the world with a uniform service of transmitting packet-based text, digitized audio or video data, and multimedia data at or above 2 Mbps.

Particularly, the UMTS system uses a transport channel, i.e., an Enhanced uplink Dedicated CHannel (E-DCH), attempting to improve the performance of uplink packet transmission from User Equipments (UEs) to a Node B (or Base Station (BS)). To support more stable high-speed data transmission, the E-DCH adopts Adaptive Modulation and Coding (AMC), Hybrid Automatic Repeat reQuest (HARQ), Node B-controlled scheduling, and a shorter Transmission Time Interval (TTI).

AMC is a scheme for increasing the use efficiency of resources by determining a modulation scheme and a coding scheme for a data channel according to the channel status between a Node B and a UE. A combination of modulation scheme and a coding scheme is commonly referred to as a Modulation and Coding Scheme (MCS). Many MCS levels can be defined according to the supported modulation and coding schemes. As an MCS level is selected adaptively according to the channel status between a Node B and a UE, AMC increases the use efficiency of resources.

HARQ is a retransmission technique for compensating an erroneous packet when an initially transmitted data packet has errors. HARQ techniques can be categorized into Chase Combining (CC) and Incremental Redundancy (IR). In CC, a packet of the same format as an initial transmission packet having errors is retransmitted, whereas in IR, a packet having a different format from that of an initial transmission packet having errors is retransmitted. To increase the data rate, HARQ utilizes an N-channel Stop And Wait (SAW).

More specifically, according to N-channel SAW, a transmitter transmits different data during first to $N^{th}$ TTIs and during $(N+1)^{th}$ to $2N^{th}$ TTIs, determines whether to retransmit the transmitted data or transmit new data depending on the reception of an ACKnowledgment/Negative ACKnowledgment (ACK/NACK) for the transmitted data. Each set of N TTIs are processed by independent HARQ processes and an $(N+i)^{th}$ TTI is referred to as an $i^{th}$ HARQ process, where N is an integer larger than 0 and the variable i indicating an HARQ process number is a natural number ranging from 1 to N.

Regarding data transmission on the E-DCH, a Node B determines if the uplink data transmission is available and, when it is available, the Node B determines the highest available data rate for the uplink transmission. The Node B transmits the determined information as a scheduling grant to a UE. Thereafter, the UE determines the data rate of the E-DCH based on the scheduling grant and transmits data at the data rate. This is commonly referred to as Node B-controlled scheduling.

A TTI is a basic transmission unit of packet data. Use of a 2-ms TTI shorter than the shortest 10-ms TTI used in legacy systems reduces a retransmission time delay and consequently, increases system throughput.

In the UMTS system, a time-domain transmission unit is represented in slots or frames. A 2-ms subframe is defined by three slots and a 10-ms frame is defined by five subframes. Therefore, the 2-ms E-DCH TTI corresponds to one subframe and the 10-ms E-DCH TTI corresponds to one frame.

Figure 1:
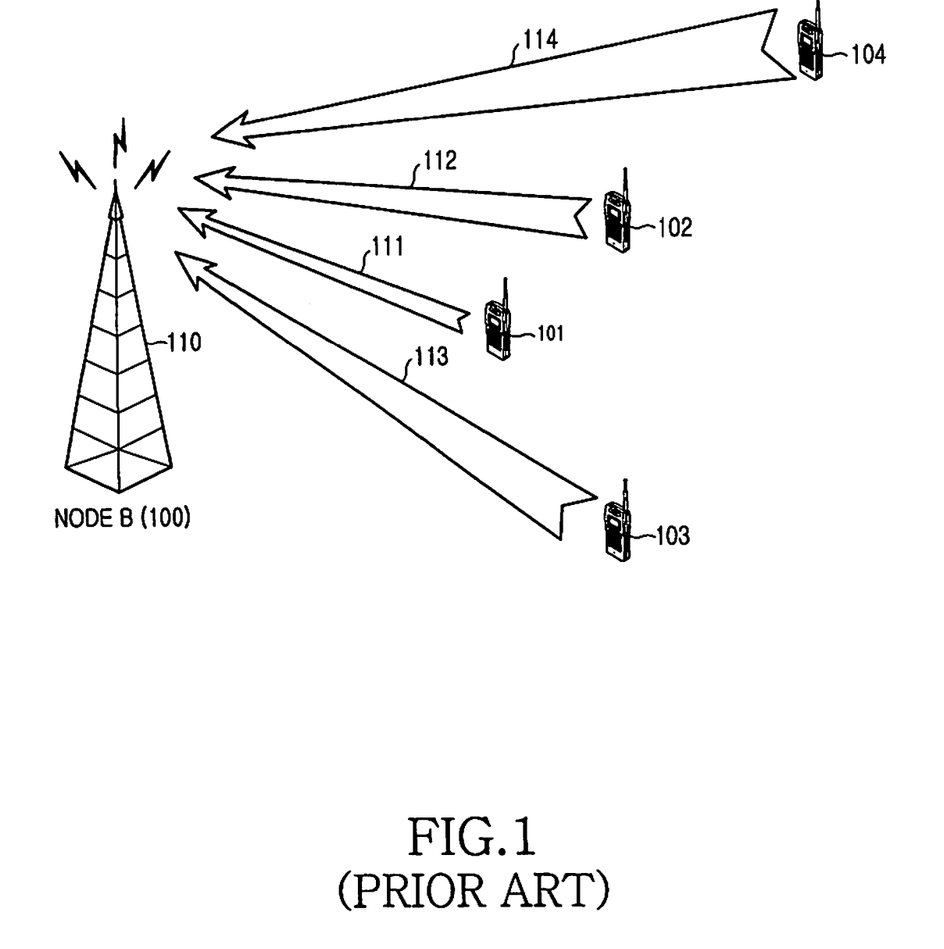
FIG. 1 illustrates uplink packet transmission on E-DCHs in a conventional wireless communication system.

FIG. 1 illustrates uplink packet transmission on E-DCHs in a conventional wireless communication system.

Referring to FIG. 1, reference numeral 100 denotes a Node B supporting E-DCHs and reference numerals 101 to 104 denote UEs using the E-DCHs. Herein, the terms BS and Node B are interchangeably used in the same sense. The UEs 101 to 104 transmit data on E-DCHs 111 to 114 to the Node B 100. The Node B 100 collects information about the buffer occupancy state, requested data rates, or channel statuses of the UEs 101 to 104 and performs a scheduling operation by determining the availability of E-DCH data transmission and an E-DCH data rate for each UE. Thereafter, the Node B 100 transmits scheduling grants to the individual UEs 101 to 104. The scheduling is done such that lower data rates are allocated to remote UEs, for example, the UEs 103 and 104, and higher data rates are allocated to nearby UEs, for example, the UEs 101 and 102, within a target noise rise or Riser over Thermal (RoT) of the Node B 100 in order to increase overall system performance. The UEs 101 to 104 determine their maximum allowed data rates for E-DCH data transmission according to the scheduling grants, determine E-DCH data rates within the maximum allowed data rates according to their buffer occupancy states, and transmit E-DCH data at the determined data rates.

Because uplink signals from different UEs are not synchronized and thus are not mutually orthogonal, they often interfere with one another. As the Node B receives more uplink signals, interference to an uplink signal from a particular UE increases, thereby decreasing the reception performance of the uplink signal. To overcome this problem, the uplink transmit power of the UE may be increased, which then interferes with other uplink signals, decreasing their reception performances. Consequently, the total power of uplink signals that the Node B can receive with acceptable reception performance is limited. RoT represents the uplink radio resources available to the Node B, and is defined as shown in Equation (1).

$$RoT = Io/No \qquad (1)$$

In Equation (1), Io denotes a power spectral density over a total reception band, i.e., the total power of all uplink signals received at the Node B, and No denotes the thermal noise power spectral density of the Node B. Therefore, a total allowed RoT, i.e., the total uplink radio resources available to the Node B, is limited to a predetermined value or below.

The total RoT is expressed as the sum of inter-cell interference, voice traffic, and E-DCH traffic. Because Node B-controlled scheduling prevents simultaneous transmission of packets at high data rates from UEs, the reception RoT of the Node B can be maintained at or below a target RoT, thereby ensuring acceptable reception performance all the time. That is, when high data rates are allocated to particular UEs, they are not allowed for other UEs in Node B-controlled scheduling. Consequently, the reception RoT does not exceed the target RoT, thus preventing the degradation of system performance.

Figure 2:
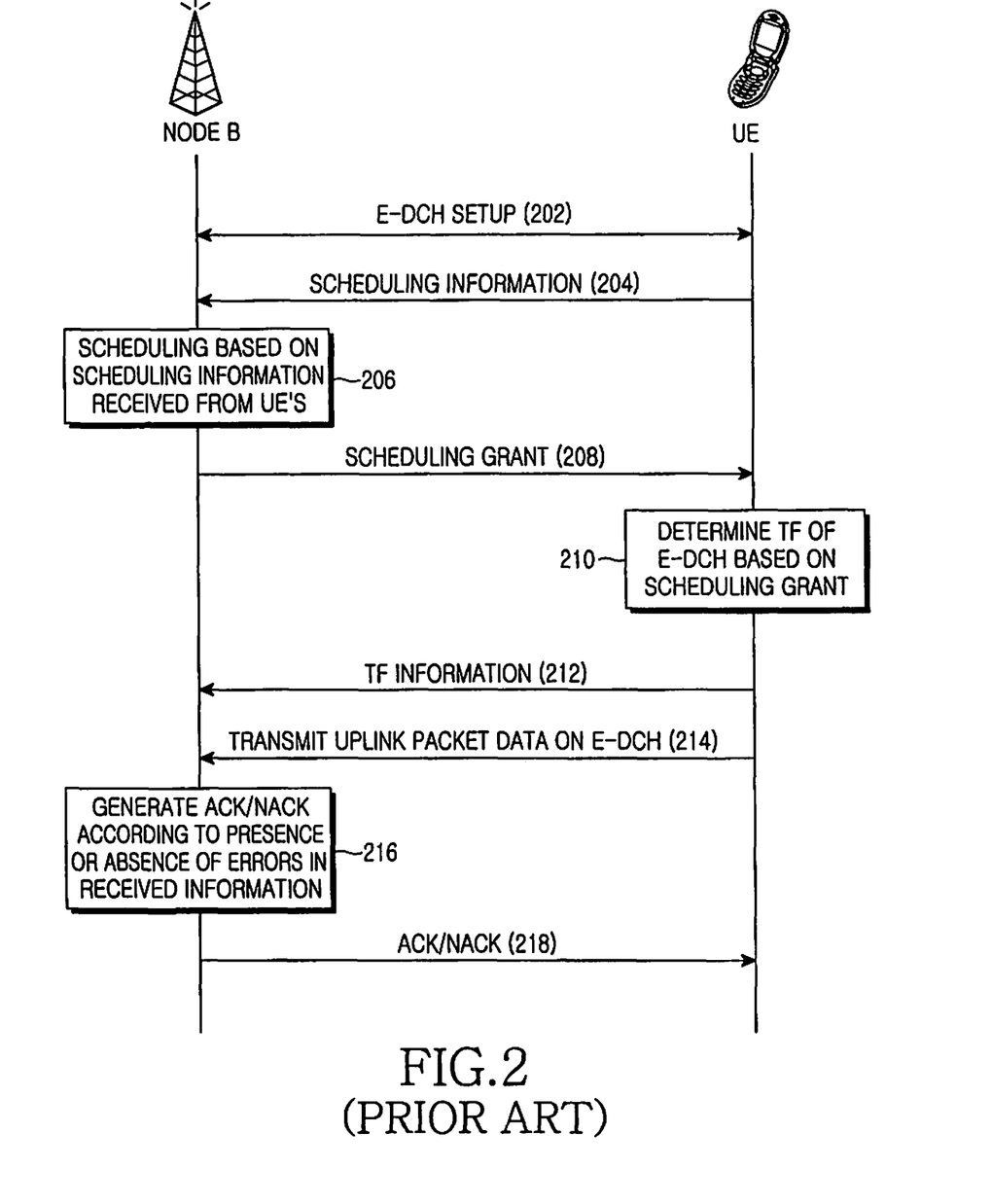
FIG. 2 is a flowchart illustrating a conventional operation for transmitting and receiving an E-DCH.

FIG. 2 is a flowchart illustrating a conventional operation for transmitting and receiving an E-DCH.

Referring to FIG. 2, a Node B and a UE establish an E-DCH in step 202. The E-DCH setup involves exchanging messages on dedicated transport channels. In step 204, the UE transmits scheduling information to the Node B. The scheduling information includes UE transmit power information such as uplink channel information, information about extra available transmit power of the UE, and an amount of transmission data buffered in a UE buffer.

Upon receipt of scheduling information from a plurality of UEs communicating with the Node B, the Node B performs scheduling based on the scheduling information in step 206. More specifically, the Node B receives information transmitted for uplink transmission from the UEs and schedules the UEs based on the received information.

In step 208, the Node B transmits scheduling grants to UEs to which the Node B decides to grant uplink packet transmission. The scheduling grants may indicate increase/keep/decrease of maximum allowed data rates for the UEs through an E-DCH Relative Grant CHannel (E-RGCH), or may indicate maximum allowed data rates and allowed transmission timings through an E-DCH Absolute Grant CHannel (E-AGCH).

In step 210, the UE determines a Transport Format (TF) of an E-DCH according to the scheduling grant. The UE then simultaneously transmits TF information with transmitting uplink packet data on the E-DCH to the Node B in steps 212 and 214. The TF information includes an Enhanced Transport Format Combination Indicator (E-TFCI) indicating resource information needed to demodulate the E-DCH. The UE selects an MCS level, taking into account the maximum allowed data rate allocated by the Node B and its channel status and transmits the uplink packet data using the MCS level in step 214. A physical layer channel, i.e., an E-DCH Dedicated Physical Control CHannel (E-DPCCH), carries the E-TFCI information and a physical layer channel, i.e., an E-DCH Dedicated Physical Data CHannel (E-DPDCH), delivers the uplink packet data. Along with the E-DPDCH/E-DPCCH, a Dedicated Physical Control CHannel (DP-CCH) is also transmitted, for use in channel estimation and power control of the Node B.

In step 216, the Node B determines if the TF information and the packet data have errors and generates an ACK/NACK signal according to the determination. If at least one of the TF information and the packet data has errors, the Node B transmits a NACK signal to the UE on an E-DCH HARQ Indicator CHannel (E-HICH), and if none of the TF information and the packet data have errors, the Node B transmits an ACK signal to the UE on the E-HICH in step 218. After an ACK signal, the packet data transmission is completed and the UE transmits new user data on the E-DCH. However, after a NACK signal, the UE retransmits the same packet data to the Node B on the E-DCH.

In the above-described operation illustrated in FIG. 2, if the Node B can receive scheduling information, such as the buffer occupancy states and power states of UEs from the UEs, it can allocate lower data rates to remote UEs, UEs in poor channel status, or UEs having lower-priority transmission data, or can allocate higher data rates to nearby UEs, UEs in good channel status, or UEs having higher-priority transmission data in order to increase overall system performance.

Typically, the RACH is used for signaling from a UE to a Node B. For example, the UE uses the RACH to register to a network after a power-on, to update its location information, or to initiate a call. Therefore, the RACH should have a relatively low data rate and wide cell coverage. Because the RACH is transmitted without a call connected to the UE, the UE has no knowledge of a necessary transmit power value. Accordingly, the UE roughly adjusts the transmit power value required for the RACH transmission by open-loop power control. The RACH includes a RACH preamble for initial access and a RACH message for data transmission. The Node B uses an Acquisition Indicator CHannel (AICH) as a response channel for the RACH preamble.

Figure 3:
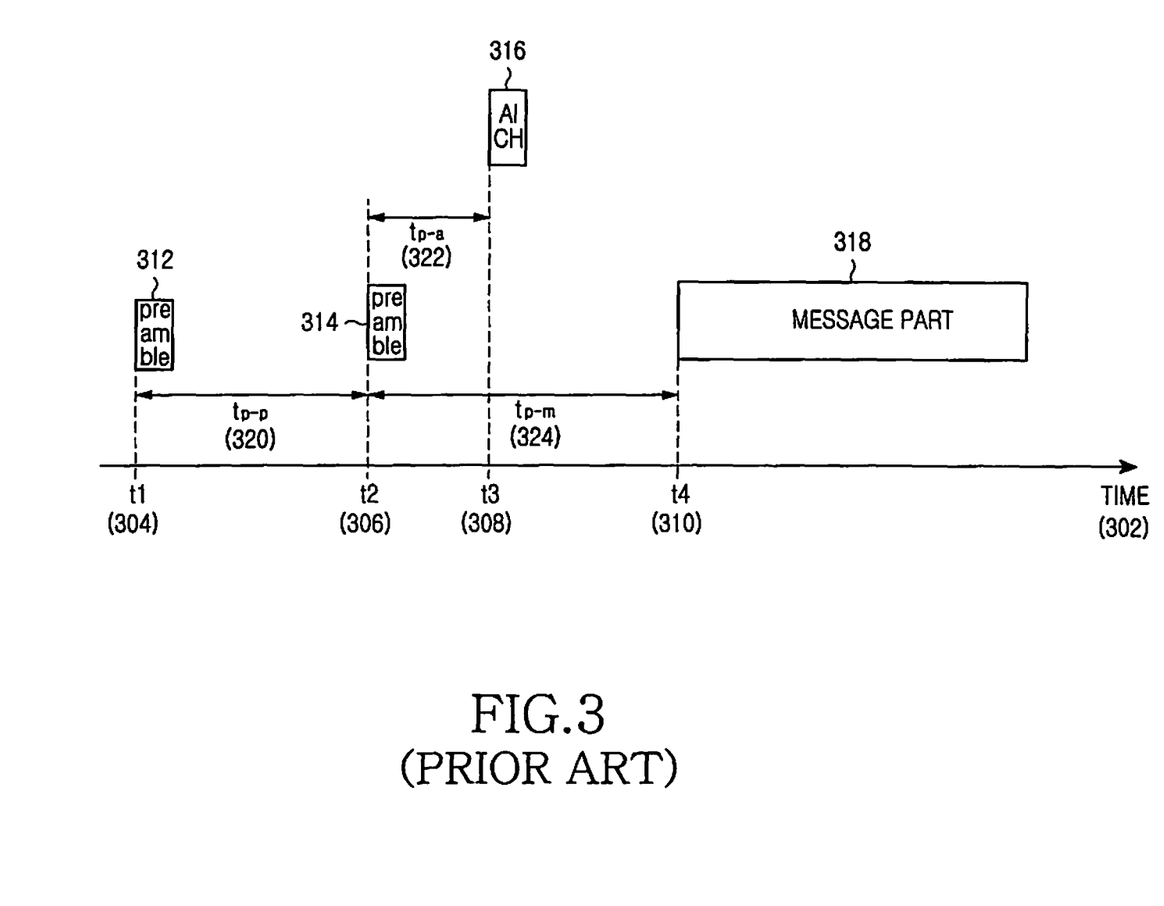
FIG. 3 illustrates a conventional physical layer RACH transmission procedure.

FIG. 3 illustrates a conventional physical layer RACH transmission procedure.

Referring to FIG. 3, the UE is first aware of RACH transmission resources including RACH access slots being RACH transmittable periods and signatures for UE identification on a Broadcast CHannel (BCH). The UE randomly selects a RACH access slot and a signature from among the RACH transmission resources and determines an initial RACH transmit power level by applying a predetermined offset to a measurement of a received downlink channel. The UE transmits a RACH preamble 312 including the selected signature at the determined initial RACH transmit power level in the selected RACH access slot. In FIG. 3, the initial RACH preamble 312 is initially transmitted at time t1 304. When receiving the RACH preamble 312 without errors, the Node B feeds back the signature included in the RACH preamble 312 as an ACK signal on an AICH. On the contrary, if failing to receive the RACH preamble 312 from the UE, the Node B does not transmit the AICH to the UE and the UE retransmits an RACH preamble 314 at a power level higher than the transmit power of the initial RACH preamble 312 by a predetermined value in an available RACH access slot.

In FIG. 3, the retransmitted RACH preamble 314 is infinitivally transmitted at time t2 306. The Node B notifies the UE that it has succeeded in receiving the RACH preamble 314 by transmitting an AICH 316 at time t3 308. Upon receipt of the AICH 316, the UE transmits intended data in a RACH message 318 at time t4 310. A time spacing $t_{p-p}$ 320 between the RACH preambles 312 and 314, a time spacing $t_{p-a}$ 322 between the RACH preamble 314 and the AICH 316 corresponding to the RACH preamble 314, and a time spacing $t_{p-m}$ 324 between the RACH message 318 and the previous RACH preamble 314 are pre-defined, i.e., known to both the Node B and the UE.

With the recent introduction of the E-DCH to the RACH, active research is underway to support a service requiring a periodic connection or a higher data rate than the conventional RACH, such as a HyperText Transfer Protocol (HTTP) request or Voice over Internet Protocol (VoIP)

service. Accordingly, a need exists for specifying a RACH transmission procedure to support the service on the RACH.

SUMMARY OF THE INVENTION

The present invention has been designed to address at least the problems and/or disadvantages described above and to provide at least the advantages described below. Accordingly, an aspect of the embodiments of the present invention is to provide an apparatus and method for defining a new RACH transmission procedure in a mobile communication system supporting an E-DCH.

Another aspect of the embodiments of the present invention provides an apparatus and method for supporting a RACH transmission procedure that increases system efficiency in a mobile communication system supporting an E-DCH.

Another aspect of the embodiments of the present invention provides an apparatus and method for increasing system throughput by defining a transmission/reception timing relationship among a RACH preamble, an AICH, and an E-DPDCH/E-DPCCH in a RACH transmission procedure in a mobile communication system supporting an E-DCH.

In accordance with an aspect of the embodiments of the present invention, there is provided a method for transmitting an enhanced RACH in a UE in a mobile communication system, in which the UE transmits an uplink preamble to a Node B and upon receipt of an ACK for the uplink preamble, transmits an E-DCH and a DPCCH to the Node B. The transmission of the DPCCH starts before the transmission of the E-DCH.

In accordance with another aspect of the embodiments of the present invention, there is provided a method for receiving an enhanced RACH in a Node B in a mobile communication system, in which upon receipt of an uplink preamble from a UE, the Node B transmits an ACK for the uplink preamble on a response channel to the UE, and receives an E-DCH and a DPCCH from the UE in response to the ACK. The reception of the DPCCH starts before the reception of the E-DCH.

In accordance with another aspect of the embodiments of the present invention, there is provided an apparatus for transmitting an enhanced RACH in a UE in a mobile communication system, in which a preamble generator transmits an uplink preamble to a Node B, an AICH detector detects an ACK for the uplink preamble on a response channel received from the Node B, and an E-DCH/DPCCH generator generates an E-DCH and a DPCCH from a data buffer, when the ACK is detected and transmits the E-DCH and the DPCCH through a transmitter. The E-DCH/DPCCH generator starts to transmit the DPCCH prior to the E-DCH.

In accordance with another aspect of the embodiments of the present invention, there is provided an apparatus for receiving an enhanced RACH in a Node B in a mobile communication system, in which a preamble receiver receives an uplink preamble from a UE, an AICH generator transmits an ACK for the uplink preamble on a response channel to the UE, and an E-DCH/DPCCH generator receives a signal from the UE in response to the ACK and detects E-DCH data and DPCCH data from the received signal. The E-DCH/DPCCH detector starts to receive and detect the DPCCH prior to the E-DCH data.

BRIEF DESCRIPTION OF THE DRAWINGS

The above and other aspects, features, and advantages of embodiments of the present invention will be more apparent from the following detailed description taken in conjunction with the accompanying drawings, in which.

DETAILED DESCRIPTION OF EMBODIMENTS OF THE PRESENT INVENTION

The matters described in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the present invention. Also, descriptions of well-known functions and constructions are omitted for clarity and conciseness.

Embodiments of the present invention will be described in the context of transmitting data on an E-DCH, when data is transmitted in a RACH transmission procedure in a UMTS communication system, by way of example.

Figure 4:
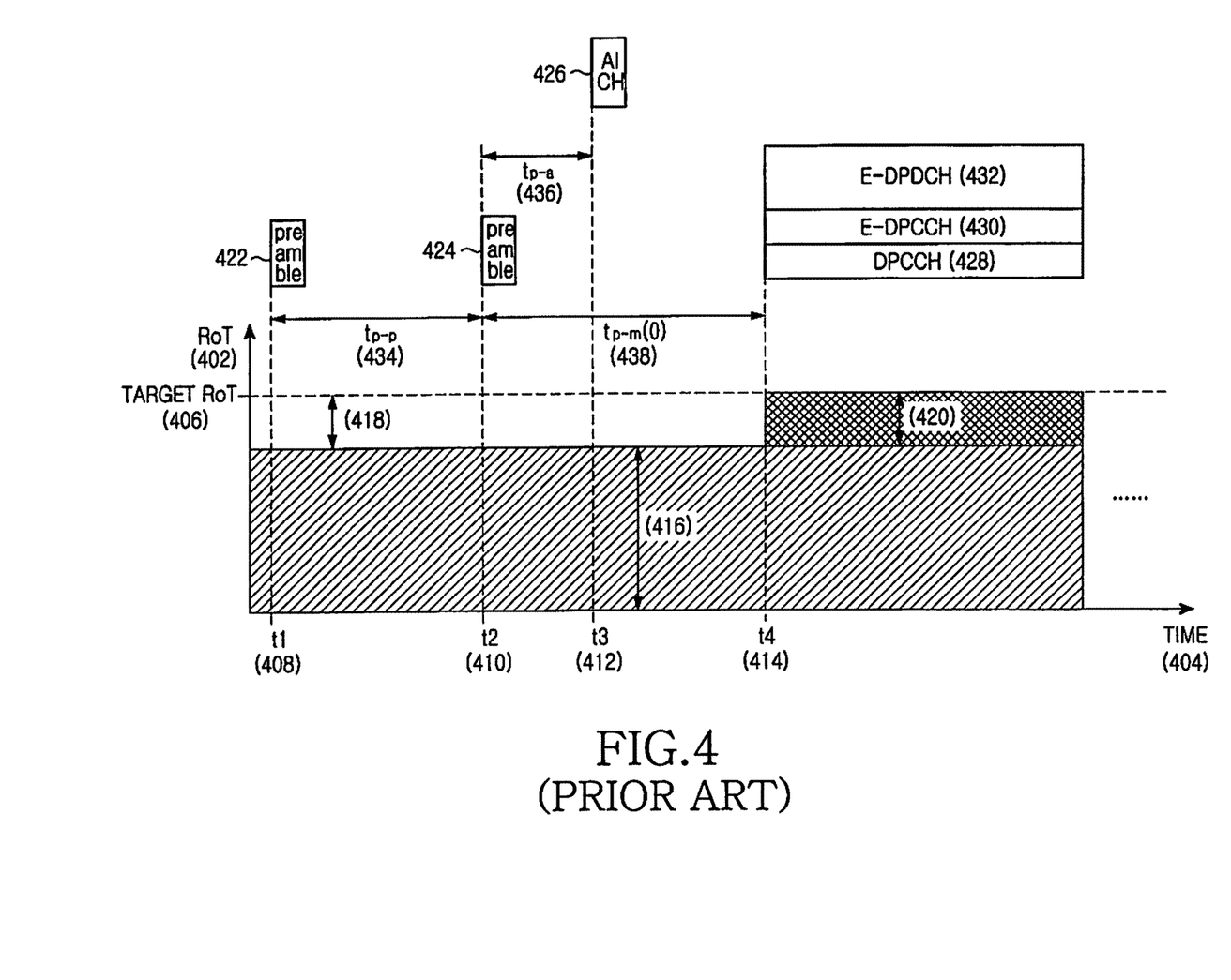
FIG. 4 illustrates a change of an RoT in a conventional physical layer RACH transmission procedure.

FIG. 4 illustrates a change of an RoT in a conventional physical layer RACH transmission procedure.

Referring to FIG. 4, a vertical axis 402 represents an uplink RoT and a horizontal axis 404 represents time. Before the RACH transmission procedure starts, a UE is aware of RACH transmission resources including RACH access slots such as RACH transmittable periods and signatures for UE identification on a BCH. The UE randomly selects a RACH access slot and a signature from among the RACH transmission resources and determines an initial RACH transmit power level by applying a predetermined offset to a measurement of a received downlink channel. The UE initially transmits a RACH preamble 422 including the selected signature at the determined initial RACH transmit power level in the selected RACH access slot at time t1 408.

In the scenario illustrated in FIG. 4, the UE fails to receive an AICH for the RACH preamble 422. As the UE does not receive the AICH for a predetermined time, it starts to retransmit an RACH preamble 424 at a power level higher than the transmit power of the initial RACH preamble 422 by a predetermined value in an available RACH access slot at time t2 410. This operation is repeated until the Node B receives an RACH preamble. It is assumed in FIG. 4 that the Node B succeeds in receiving a second RACH preamble. Accordingly, upon successfully receiving the retransmitted RACH preamble 424, the Node B starts to feed back the signature included in the RACH preamble 424 as an ACK signal on an AICH 426 at t3 412.

Upon receipt of the AICH 426, the UE starts to transmit intended RACH data on an E-DPDCH 432 at time t4 414. Simultaneously, an E-DPCCH 430 carrying information about the TF of the E-DPDCH and a DPCCH 428 for channel estimation and power control are transmitted. It is noted that the DPCCH 428 can be transmitted at a predetermined time earlier than t4 414 so that it can be used for power control before the RACH data transmission.

A time spacing $t_{p-p}$ 434 between the RACH preambles 422 and 424, a time spacing $t_{p-a}$ 436 between the RACH preamble 424 and the AICH 426 corresponding to the RACH preamble 424, and a time spacing $t_{p-m}(0)$ 438 between the RACH message and the previous RACH preamble 424 are pre-defined, known to both the Node B and the UE.

The total power of uplink signals that the Node B can receive with acceptable reception performance is limited to or below a predetermined value, i.e., a target RoT 406. If the total RoT of a cell exceeds the target RoT, a required reception performance cannot be satisfied for uplink signals. However, if the total RoT is maintained far lower than the target RoT in the cell, available RoT resources are wasted, thereby decreasing system efficiency. Therefore, the Node B needs to effectively control the RoT of the cell to be equal to or lower than the target RoT.

In the scenario illustrated in FIG. 4, the Node B predicts an RoT 420 to be used for the E-DCH data transmission of the UE after t4 414 and limits RoT allocation, taking into account the RoT 420 even before t4 414, thereby keeping the total RoT at or below the target RoT 406. During the time period from t1 408 to t4 414, the Node B maintains the total RoT to be the sum of a total RoT 416 caused by uplink transmission from other UEs and an RoT 418 spared for allocation of the RoT 410 for the E-DCH data transmission of the UE. Because the Node B cannot predict the RoT 420 for the E-DCH data transmission of the UE before t4 414, it spares the RoT 418 sufficiently. Therefore, the total RoT is controlled to be the target RoT 406 or below at a given instant, but resource utilization gets inefficient due to the spared RoT 418 during the time period from t1 408 to t4 414.

Figure 5:
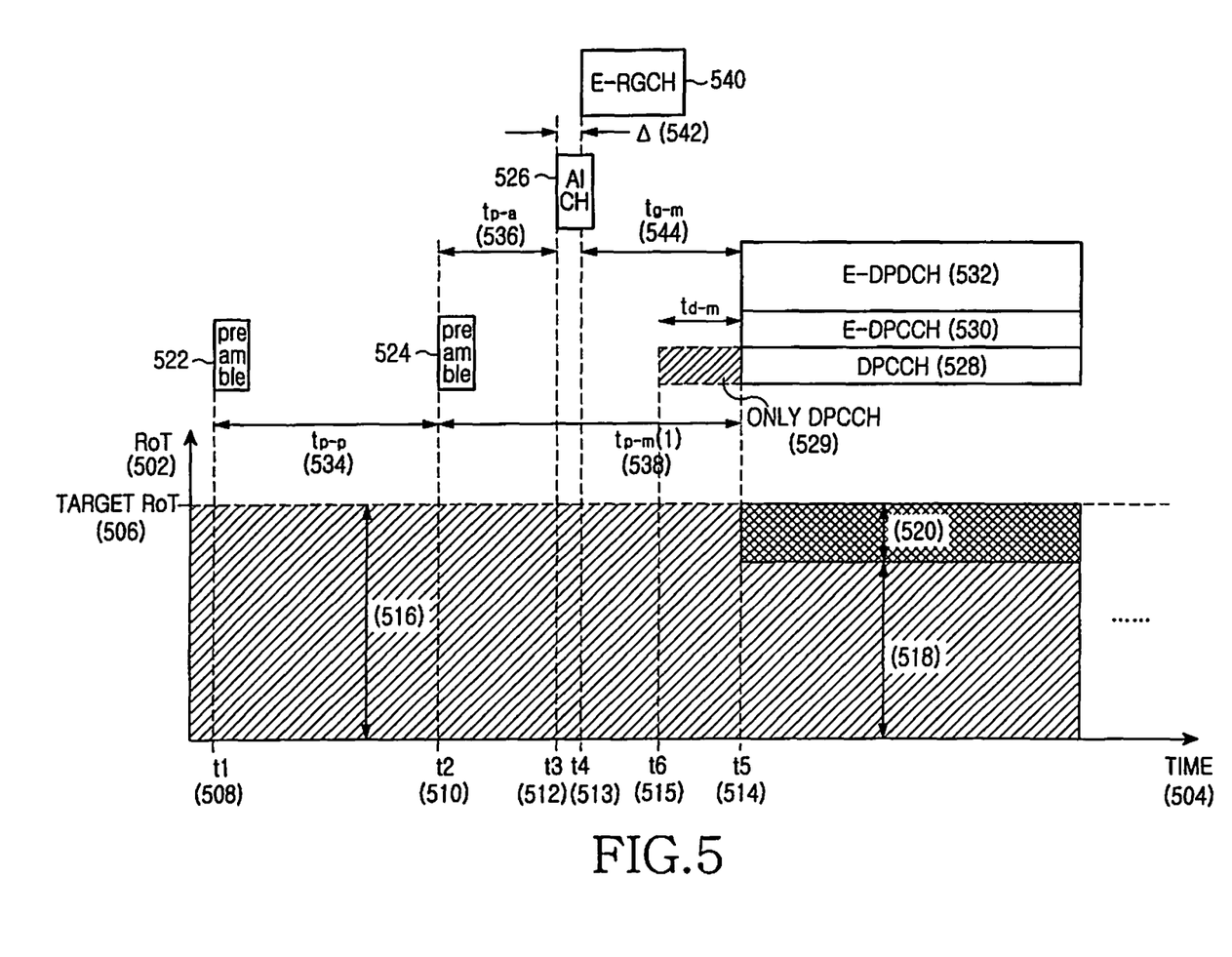
FIG. 5 illustrates a change of an RoT in an enhanced physical layer RACH transmission procedure according to an embodiment of the present invention.

FIG. 5 illustrates an enhanced physical layer RACH transmission procedure proposed to avoid inefficient use of RoT resources as described with reference to FIG. 4, and an RoT change in the enhanced physical layer RACH transmission procedure.

Referring to FIG. 5, a vertical axis 502 represents an uplink RoT and a horizontal axis 504 represents time. Before the RACH transmission procedure starts, a UE is aware of RACH transmission resources including RACH access slots such as RACH transmittable periods and signatures for UE identification on a BCH. The UE randomly selects a RACH access slot and a signature from among the RACH transmission resources.

The UE determines an initial RACH transmit power level by applying a predetermined offset to a measurement of a received downlink channel. The UE initially transmits a RACH preamble 522 including the selected signature at the determined initial RACH transmit power level in the selected RACH access slot at time t1 508.

In FIG. 5, the UE fails to receive an AICH for the RACH preamble 522 and starts to retransmit a RACH preamble 524 at a power level higher than the transmit power of the initial RACH preamble 522 by a predetermined value in an available RACH access slot at time t2 510.

Thereafter, the Node B successfully receives the retransmitted RACH preamble 524 and starts to feed back the signature included in the RACH preamble 524 as an ACK signal on an AICH 526 at time t3 512.

In addition, the Node B transmits scheduling grants 540 to other E-DCH UEs according to its scheduling and adjusts a total RoT 518 caused by the UEs after time t5 514. Consequently, the Node B secures an RoT 520 for E-DCH data transmission 532 of the UE within a target RoT 506. Accordingly, to apply the scheduling grants 540 after time t5 514, a sufficient time margin should be ensured between the scheduling grants 540 and the E-DCH data transmission 532, i.e., a sufficient time should be ensured between t4 513 to t5 514.

With regards to the generation or transmission time of the scheduling grants 540 for the other E-DCH UEs, the Node B generates or transmits the scheduling grants 540 to the other E-DCH UEs a time Δ 542 after the transmission start time of the AICH 526, t3 512, thereby reflecting the E-DCH scheduling result of the UE in generating the scheduling grants 540 for the other E-DCH UEs. Δ 542 is equal to or larger than 0. The scheduling grants 540 may indicate increase/keep/decrease of maximum allowed data rates for the UEs over an E-RGCH, or indicate maximum allowed data rates and allowed transmission timings over an E-AGCH.

Upon receipt of the AICH 526, the UE initially transmits intended RACH data on the E-DPDCH 532 at time t5 514. An E-DPCCH 530 carrying information about the TF of the E-DPDCH 532 and a DPCCH 528 for channel estimation and power control are simultaneously transmitted. It is noted that the DPCCH 528 can be transmitted at a predetermined time earlier than t5 514. That is, only the DPCCH 528 is transmitted during a time period $t_{d-m}$ 529 between t6 515 and t5 514. This time period is referred to as an only DPCCH transmission interval. Meanwhile, $t_{d-m}$ 529 can be determined in proportion to an E-DCH TTI. For example, $t_{d-m}$ 529 can be 20 ms for a 10-ms E-DCH TTI and $t_{d-m}$ 529 can be 6 ms for a 2-ms E-DCH TTI.

A time spacing $t_{p-p}$ 534 between the RACH preambles 522 and 524, a time spacing $t_{p-a}$ 536 between the RACH preamble 524 and the AICH 526 corresponding to the RACH preamble 524, a time spacing $t_{p-m}(1)$ 538 between the RACH data and the previous RACH preamble 524, the time spacing Δ 542 between the AICH 526 and the scheduling grants 540 for the other E-DCH UEs, and a time spacing $t_{g-m}$ 544 between the RACH data and the scheduling grants 540 are pre-defined, i.e., they are known to both the Node B and the UE as the Node B notifies the UE of any of the time spacings. The relationship among the time spacings is shown below in Equation (2).

$$t_{p-m}(1) = t_{p-a} + t_{g-m} + \Delta (\Delta >= 0) \quad (2)$$

Compared to the scenario illustrated in FIG. 4, in FIG. 5, the Node B defines $t_{p-m}(1)$ to be larger than $t_{p-m}(0)$ in order to maintain the total RoT at or below the target RoT 506, after the RACH data transmission time t5 514 of the UE in the RACH transmission procedure. This more efficient use of RoT resources involved in securing an RoT for the UE before the RACH data transmission of the UE increases system efficiency.

Further, $t_{p-m}(1)$ can be set according to the length of the E-DCH TTI. For example, $t_{p-m}(1)_{10\ ms}$ for the 10-ms E-DCH TTI is greater than or is at least equal to $t_{p-m}(1)_{2\ ms}$ for an 2-ms E-DCH TTI, in proportion to the length of the E-DCH TTI. This is shown below in Equation (3).

$$t_{p-m}(1)_{10\ ms} = t_{p-m}(1)_{2\ ms} + \Delta_e (\Delta_e >= 0) \quad (3)$$

In Equation (3), $\Delta_e$ denotes the difference between $t_{p-m}(1)$ for the 10-ms E-DCH TTI and $t_{p-m}(1)$ for the 2-ms E-DCH TTI.

In accordance with an embodiment of the present invention, a method for setting $t_{p-m}(1)_{10\ ms}$ to be equal to or larger than $t_{p-m}(1)_{2\ ms}$ in proportion to the length of the E-DCH TTI can be expressed as shown in Equation (4) below. That is, $t_{g-m,10\ ms}$ for the 10-ms E-DCH is set to be at least equal to or larger than $t_{g-m,2\ ms}$ for the 2-ms E-DCH so that $t_{p-m}(1)_{10\ ms}$ is greater than or equal to $t_{p-m}(1)_{2\ ms}$ in proportion to the length of the E-DCH TTI.

$$t_{p-m}(1)_{10\ ms} = t_{p-a} + t_{g-m,10\ ms} + \Delta_{10\ ms} (\Delta_{10\ ms} >= 0)$$

$$t_{p-m}(1)_{2\ ms} = t_{p-a} + t_{g-m,2\ ms} + \Delta_{2\ ms} (\Delta_{2\ ms} >= 0)$$

$$t_{g-m,10\ ms} = t_{g-m,2\ ms} + \Delta_e \text{ or } \Delta_e = \Delta_{10\ ms} - \Delta_{2\ ms} (\Delta_e >= 0) \quad (4)$$

A description will now be made of transmission and reception procedures and apparatus of a Node B and a UE according to embodiments of the present invention.

An embodiment of the present invention provides transmission and reception procedures and apparatus of a Node B and a UE that operate as illustrated in FIG. 5.

Figure 6:
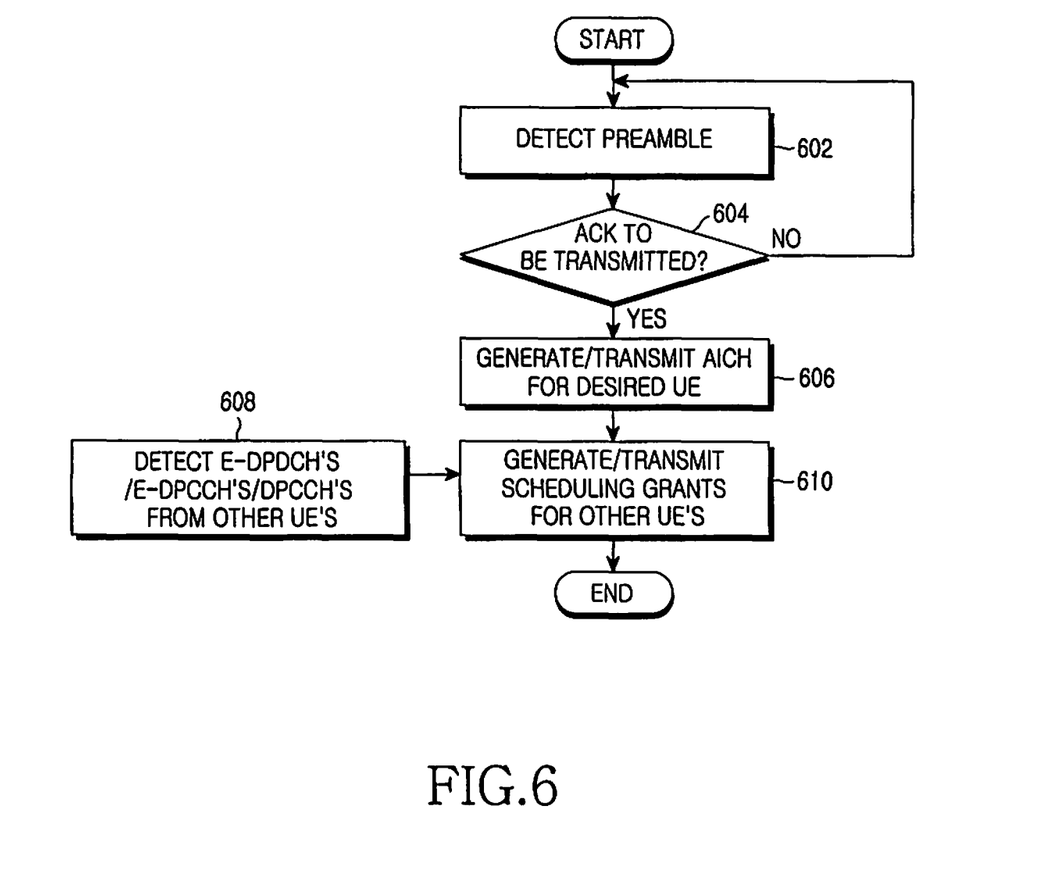
FIG. 6 is a flowchart illustrating a Node B operation according to an embodiment of the present invention.

FIG. 6 is a flowchart illustrating a transmission/reception operation of a Node B in an enhanced RACH transmission procedure according to an embodiment of the present invention.

Referring to FIG. 6, the Node B detects a RACH preamble received from a UE in step 602 and determines if the RACH preamble has errors in step 604. As the Node B notifies the UE of RACH preamble transmission times on a BCH beforehand, the RACH preamble transmission times are known to both the UE and the Node B. If the transmit power of the RACH preamble from the UE is so large as to avoid interference from other UEs and the Node B successfully receives the RACH preamble from the UE, the Node B generates an ACK signal for the RACH preamble in step 606. However, if the Node B fails to receive the RACH preamble from the UE in step 604, it re-tries to detect a RACH preamble from the UE in step 602. The relationship between the transmission time of a last transmitted RACH preamble and a RACH preamble retransmission time is preset. Therefore, both the Node B and the UE are commonly aware of available RACH preamble transmission/reception times.

When generating the ACK signal in step 606, the Node B includes a signature included in the received RACH preamble in an AICH. A relative time relationship between the successfully received RACH preamble and the AICH is also preset.

The Node B receives E-DPDCHs/E-DPCCHs/DPCCHs from other E-DCH UEs in step 608 and schedules them based on the received E-DPDCHs/E-DPCCHs/DPCCHs in step 610. The Node B notifies each UE of the scheduling result on an E-RGCH or an E-AGCH. The scheduling operation of step 610 is performed simultaneously with or later than the ACK generation of step 606, so that RACH data transmission from the UE in correspondence with the ACK signal and its associated RoT can be reflected in the scheduling. Because the transmission time of RACH data from the UE is preset, based on a relative time relationship between the RACH data transmission time and the last transmitted RACH preamble, both the Node B and the UE are aware of the RACH data transmission/reception time. The data rate of the RACH data that the UE transmits after receiving the ACK signal is preset or limited to or below a predetermined value by Node B signaling, thus suppressing excessive RoT generation. Accordingly, the Node B can predict the RACH data transmission time of the UE and the associated RoT in step 610, it lowers a total RoT resulting from the other E-DCH UEs by as much as the RoT generated from the RACH data transmission of the UE at the RACH data transmission time of the UE. Consequently, the RoT resources of the system are efficiently used.

Figure 7:
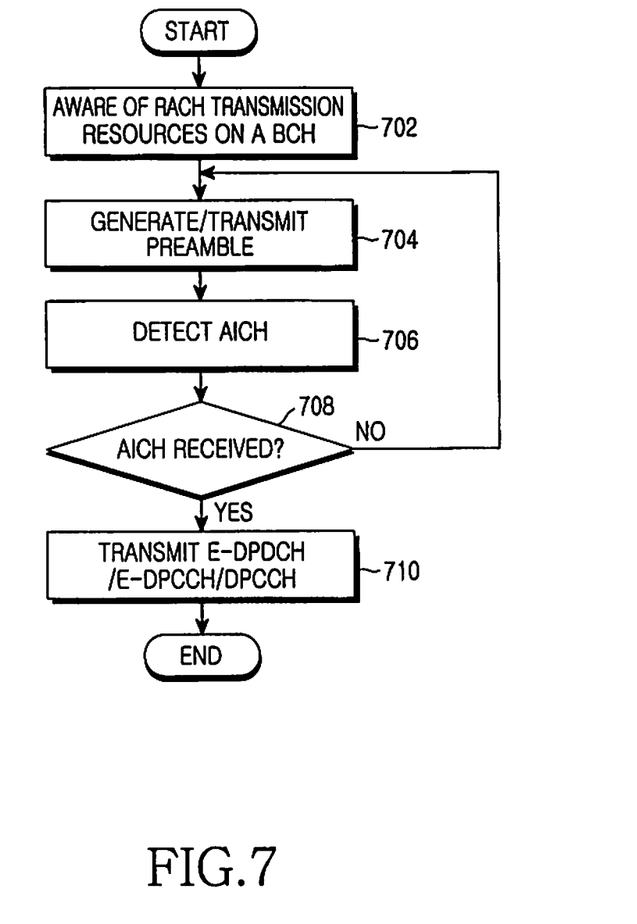
FIG. 7 is a flowchart illustrating a UE operation according to an embodiment of the present invention.

FIG. 7 is a flowchart illustrating a control operation of a UE during transmission/reception in the RACH transmission procedure according to an embodiment of the present invention.

Referring to FIG. 7, before the RACH transmission procedure, the UE is aware of RACH transmission resources including RACH access slots being RACH transmittable periods and signatures for UE identification on a BCH in step 702.

In step 704, the UE randomly selects a RACH access slot and a signature from among the RACH transmission resources and transmits a RACH preamble including the selected signature in the selected RACH access slot. The transmit power level of the RACH preamble is determined by applying a predetermined offset to a measurement of a received downlink channel.

The UE attempts to detect an AICH for the transmitted RACH preamble from the Node B a predetermined time after the transmission time of the RACH preamble in step 706.

If the UE fails to detect the AICH in step 708, it retransmits the RACH preamble in step 704. An AICH transmitted by the Node B includes a signature that a UE to receive an ACK signal from the Node B transmitted in its last RACH preamble. Therefore, the UE can determine if the AICH has been detected using its signature. A relative time relationship between the AICH and the last transmitted RACH preamble is preset.

When retransmitting the RACH preamble, the UE increases the transmit power of the previous RACH preamble by a predetermined value in an available RACH access slot. Because a relative time relationship between the last transmitted RACH preamble and a RACH preamble retransmission time is preset, both the Node B and the UE are aware of available RACH preamble transmission/reception times.

When the UE succeeds in detecting the AICH in step 708, it transmits RACH data on an E-DPDCH in step 710. At the same time, an E-DPCCH carrying information about the TF of the E-DPDCH and a DPCCH for channel estimation and power control are transmitted. As described above, the DPCCH can be transmitted a predetermined time before t4 414 so that it can be used for temporary channel estimation and power control before the RACH data transmission.

The transmission time of RACH data from the UE is preset based on a relative time relationship between the RACH data transmission time and the last transmitted RACH preamble and thus both the Node B and the UE are aware of the RACH data transmission/reception time.

Figure 8:
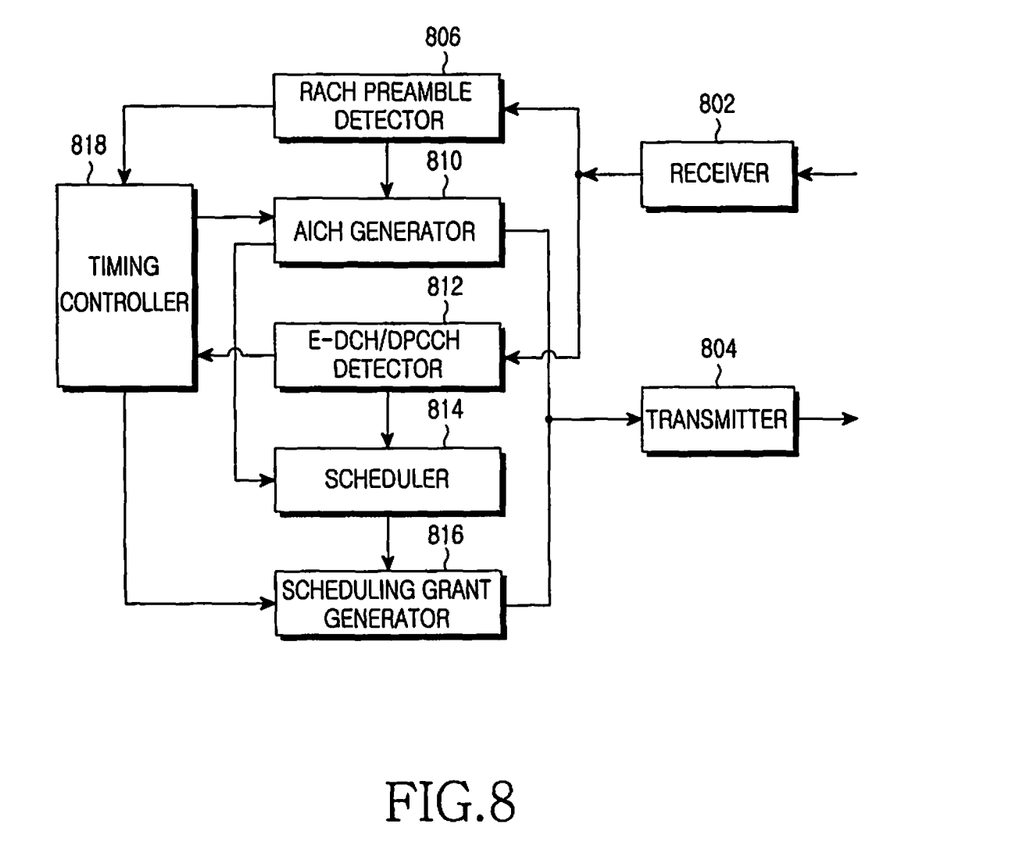
FIG. 8 is a block diagram of a Node B apparatus according to an embodiment of the present invention.

FIG. 8 is a block diagram of a transmission and reception apparatus of a Node B to support the enhanced RACH transmission procedure according to an embodiment of the present invention.

Referring to FIG. 8, the Node B receives a signal from a UE, performs a predetermined signal process on the received signal at a receiver 802, and determines if the processed signal has errors at a RACH preamble detector 806. The transmission time of the RACH preamble from the UE is present, known to the Node B and the UE.

If the reception power of the RACH preamble is so large as to avoid interference from other UEs and thus the Node B successfully receives the RACH preamble from the UE, the Node B provides a signature included in the RACH preamble to an AICH generator 810. The AICH generator 810 generates an ACK signal including the signature. After being processed in a predetermined manner at a transmitter 804, the AICH is transmitted to the UE. A relative time relationship between the successfully received RACH preamble and the generation or transmission time of the AICH is preset.

If the Node B fails to detect the RACH preamble, it awaits reception of a next RACH preamble form the UE. A relative time relationship between the RACH preambles of the UE is also preset. The RACH preamble detector 806 notifies a timing controller 818 of whether or not the RACH preamble has been received successfully so that the Node B controls a AICH transmission time or a reception time of the retransmitted RACH preamble from the UE.

The Node B extracts E-DCH-related signals from signals received from other UEs and extracts E-DCH scheduling information of each of the UEs at an E-DCH/DPCCH detector 812. A scheduler 814 performs scheduling based on the E-DCH scheduling information and scheduling information about the RACH data of the UE received from the AICH generator 810 and generates scheduling grants according to the result of the scheduling at a scheduling grant generator 816. The scheduling information about the RACH data of the UE can be the data rate of the RACH data, the transmission time of the UE, etc.

The E-DCH/DPCCH detector 812 notifies the timing controller 818 of the reception time of an E-DCH (i.e. E-DPDCH/E-DPCCH)/DPCCH so that the timing controller 818 controls a scheduling grant generation time.

Figure 9:
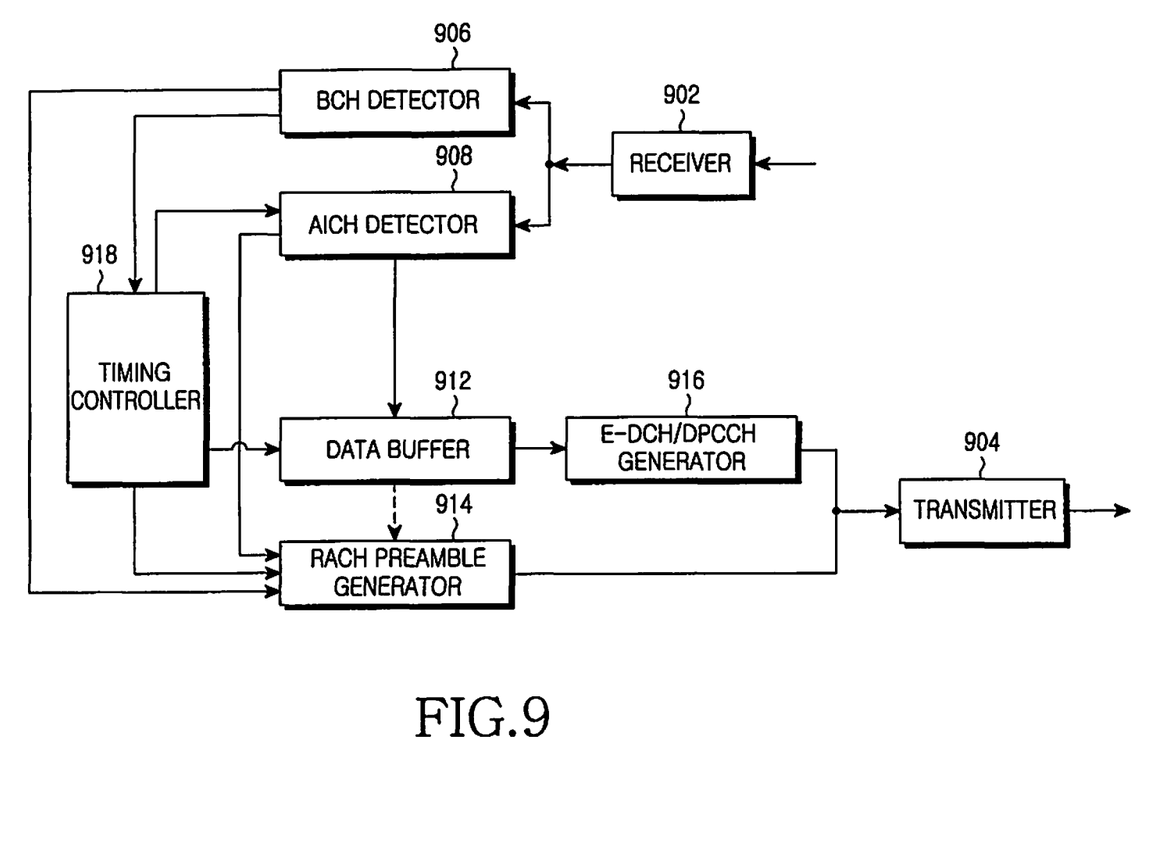
FIG. 9 is a block diagram of a UE apparatus according to an embodiment of the present invention.

FIG. 9 is a block diagram of a transmission and reception apparatus of a UE to support an enhanced RACH transmission procedure according to an embodiment of the present invention.

Referring to FIG. 9, the UE acquires information about RACH transmission resources including RACH access slots being RACH transmittable periods and signatures for UE identification on a BCH at a BCH detector 906. The UE provides information about the RACH transmittable periods to a timing controller 918 so that the timing controller 918 controls RACH transmission times of the UE.

The BCH detector 906 provides the RACH transmission resource information to a RACH preamble generator 914, for use in the generation of RACH preambles. The RACH preamble generator 914 receives information indicating the presence or absence of RACH data from a data buffer 912. When there is RACH data to be transmitted, the RACH preamble generator 914 generates a RACH preamble based on the RACH transmission resource information and transmits the RACH preamble to a Node B through a transmitter 904. Under the control of the timing controller 918, the RACH preamble generator 914 determines the transmission time of the RACH preamble.

A predetermined time after transmitting the RACH preamble, the UE attempts to detect an AICH for the RACH preamble under the control of the timing controller 918. The UE performs a predetermined signal process on a signal received from the Node B at a receiver 902 and then determines if an AICH has been detected by checking the presence or absence of a signature included in the transmitted RACH preamble in the received signal at an AICH detector 908. If the AICH detection is failed, the UE controls the RACH preamble generator 914 to retransmit the RACH preamble. If the AICH detection is successful, the UE collects RACH data from the data buffer 912 and configures an E-DPDCH with the RACH data at an E-DCH/DPCCH generator 916. The E_DPDCH is transmitted to the Node B through the transmitter 904. In addition, an E-DPCCH carrying information about the TF of the E-DPDCH and a DPCCH for channel estimation and power control are transmitted to the Node B. The DPCCH can be transmitted a predetermined time before the transmission time of the E-DPDCH and the E-DPCCH.

The data buffer 912 adjusts the transmission time of the RACH data under the control of the timing controller 918. The data buffer 912 also receives information indicating if the AICH detection is successful from the AICH detector 908 and in the case of successful AICH detection, transmits the RACH data.

In the scenario illustrated in FIG. 4, the time spacing $t_{p-m}(0)$ 438 between RACH data and its previous RACH preamble is relatively too short for the Node B to control RoT at the RACH data transmission time. From the RoT control perspective, the time spacing $t_{p-m}(0)$ 438 is not preferable. However, delay-sensitive RACH data can be transmitted in a short time. This will be referred to as "Method 1".

In the scenario illustrated in FIG. 5, the time spacing $t_{p-m}(1)$ 538 between RACH data and its previous RACH preamble is relatively so long that the Node B can control RoT at the RACH data transmission time. From the RoT control perspective, the time spacing $t_{p-m}(1)$ 538 is preferable. However, this method may not be preferable when delay-sensitive RACH data should be transmitted in a short time. The method illustrated in FIG. 5 will be referred to as "Method 2".

Accordingly, selective use of Method 1 or Method 2 for the RACH transmission procedure of the UE enables transmission delay control or RoT control when necessary. The Node B notifies the UE whether to use Method 1 or Method 2 by signaling.

Apparatuses of the Node B and the UE according to an embodiment of the present invention can be realized using the same apparatuses as illustrated in FIGS. 8 and 9. Further, Method 1 or Method 2 can be chosen for the time spacing between RACH data and its previous RACH preamble depending on the service type of the RACH data.

As is apparent from the description above, the described embodiments of the present invention advantageously increase system efficiency through RoT control by defining a transmission/reception time relationship among an RACH preamble, an AICH, and an E-DPDCH/E-DPCCH/DPCCH to improve a RACH transmission procedure in a mobile communication system supporting an E-DCH.

While the present invention has been shown and described with reference to certain embodiments of the present invention thereof, it will be understood by those skilled in the art that various changes in form and details may be made therein without departing from the spirit and scope of the present invention as defined by the appended claims and their equivalents.

What is claimed is:

1. A method for transmitting an enhanced random access channel (RACH) in a user equipment (UE) in a mobile communication system, the method comprising:

receiving a parameter related to a time period of a dedicated physical control channel (DPCCH) transmission prior to an enhanced uplink dedicated channel (E-DCH) transmission;

identifying information representative of at least one available access slot for an uplink preamble and information representative of at least one available signature for the uplink preamble;

selecting an access slot and a signature;

transmitting the uplink preamble, based on the selected access slot and the signature;

receiving an acknowledgement (ACK) for the uplink preamble; and transmitting, to a Node B, the E-DCH using short E-DCH transmission time intervals (TTIs) or long E-DCH TTIs and the DPCCH in the time period of the DPCCH, based on receipt of the ACK for the uplink preamble, wherein the DPCCH transmission is started prior to the E-DCH transmission, wherein the time period of the DPCCH transmission prior to the E-DCH transmission is determined by:

identifying a first integer value and a second integer value to be used, based on whether the short E-DCH TTIs or the long E-DCH TTIs are used for transmitting the E-DCH, determining the time period of the DPCCH transmission prior to the E-DCH transmission to be equal to the first integer value times a short E-DCH TTI, when the E-DCH is transmitted using the short E-DCH TTIs, and determining the time period of the DPCCH transmission prior to the E-DCH transmission to be equal to the second integer value times a long E-DCH TTI, when the E-DCH is transmitted using the long E-DCH TTIs, wherein the short E-DCH TTI is defined by a first plurality of slots and the long E-DCH TTI is defined by a second plurality of slots, and wherein the second plurality of slots is greater than the first plurality of slots.

2. The method of claim 1, wherein the time period of the DPCCH transmission prior to the E-DCH transmission determined using the short E-DCH TTI is shorter than the time period of the DPCCH transmission prior to the E-DCH transmission determined using the long E-DCH TTI.

3. The method of claim 1, wherein the E-DCH is at least one of a physical layer channel called an E-DCH dedicated physical data channel (E-DPDCH) and a physical layer channel called an E-DCH dedicated physical control channel (E-DPCCH).

4. The method of claim 1, wherein the short E-DCH TTI comprises one sub-frame of three slots and the long E-DCH TTI comprises five sub-frames.

5. An apparatus for transmitting an enhanced random access channel (RACH) in a user equipment (UE) in a mobile communication system, the apparatus comprising:

a receiver configured to receive a parameter related to a time period of a dedicated physical control channel (DPCCH) transmission prior to an enhanced uplink dedicated channel (E-DCH) transmission;

a preamble generator configured to identify information representative of at least one available access slot for an uplink preamble and information representative of at least one available signature for the uplink preamble, to select an access slot and a signature, and to transmit the uplink preamble, the selected access slot and signature;

an acquisition indicator channel (AICH) detector configured to detect an acknowledgement (ACK) for the uplink preamble; and a transmitter configured to transmit, to a Node B, the E-DCH using short E-DCH transmission time intervals (TTIs) or long E-DCH TTIs, and the DPCCH in the time period of the DPCCH, in response to receipt of the ACK for the uplink preamble, wherein the DPCCH transmission is started prior to the E-DCH transmission, wherein the time period of the DPCCH transmission prior to the E-DCH transmission is determined by:

identifying a first integer value and a second integer value to be used, based on whether the short E-DCH TTIs or the long E-DCH TTIs are used for transmitting the E-DCH, determining the time period of the DPCCH transmission prior to the E-DCH transmission to be equal to the first integer value times a short E-DCH TTI, when the E-DCH is transmitted using the short E-DCH TTI, and determining the time period of the DPCCH transmission prior to the E-DCH transmission is equal to the second integer value times a long E-DCH TTI, when the E-DCH is transmitted using the long E-DCH TTIs, wherein the short E-DCH TTI is defined by a first plurality of slots and the long E-DCH TTI is defined by a second plurality of slots, and wherein the second plurality of slots is greater than the first plurality of slots.

6. The apparatus of claim 5, wherein the time period of the DPCCH transmission prior to the E-DCH transmission determined using the short E-DCH TTI is shorter than the time period of the DPCCH transmission prior to the E-DCH transmission determined using the long E-DCH TTI.

7. The apparatus of claim 5, wherein the E-DCH is at least one of a physical layer channel called an E-DCH dedicated physical data channel (E-DPDCH) and a physical layer channel called an E-DCH dedicated physical control channel (E-DPCCH).

8. The apparatus of claim 5, wherein the short E-DCH TTI comprises one sub-frame of three slots and the long E-DCH TTI comprises five sub-frames.

9. A method for receiving an enhanced random access channel (RACH) in a Node B in a mobile communication system, the method comprising:

transmitting a parameter related to a time period of a dedicated physical control channel (DPCCH) transmission prior to an enhanced uplink dedicated channel (E-DCH) transmission;

receiving an uplink preamble transmitted from a user equipment (UE), where the uplink preamble is received based an access slot and a signature selected by the UE, by using information representative of at least one available access slot for the uplink preamble and information representative of at least one available signature for the uplink preamble;

transmitting an acknowledgement (ACK) for the uplink preamble on a response channel to the UE; and receiving, from the UE, the E-DCH using short E-DCH transmission time intervals (TTIs) or long E-DCH TTIs, and the DPCCH in the time period of the DPCCH, in response to the ACK, wherein the DPCCH reception is started prior to the E-DCH reception, wherein the time period of the DPCCH transmission prior to the E-DCH transmission is determined by:

identifying a first integer value and a second integer value to be used, based on whether the short E-DCH TTIs or the long E-DCH TTIs are used for receiving the E-DCH, determining the time period of the DPCCH transmission prior to the E-DCH transmission to be equal to the first integer value times a short E-DCH TTI, when the E-DCH is received using the short E-DCH TTIs, and determining the time period of the DPCCH transmission prior to the E-DCH transmission to be equal to the second integer value times a long E-DCH TTI when the E-DCH is received using the long E-DCH TTIs, wherein the short E-DCH TTI is defined by a first plurality of slots and the long E-DCH TTI is defined by a second plurality of slots, and wherein the second plurality of slots is greater than the first plurality of slots.

10. The method of claim 9, wherein the time period of the DPCCH transmission prior to the E-DCH transmission determined using the short E-DCH TTI is shorter than the time period of the DPCCH transmission prior to the E-DCH transmission determined using the long E-DCH TTI.

11. The method of claim 9, wherein the E-DCH is at least one of a physical layer channel called an E-DCH dedicated physical data channel (E-DPDCH) and a physical layer channel called an E-DCH dedicated physical control channel (E-DPCCH).

12. The method of claim 9, wherein the short E-DCH TTI comprises one sub-frame of three slots and the long E-DCH TTI comprises five sub-frames.

13. An apparatus for receiving an enhanced random access channel (RACH) in a Node B in a mobile communication system, the apparatus comprising:

a transmitter for transmitting a parameter related to a time period of a dedicated physical control channel (DPCCH) transmission prior to an enhanced uplink dedicated channel (E-DCH) transmission;

a receiver configured to receive an uplink preamble transmitted from a user equipment (UE), where the uplink preamble is received based an access slot and a signature selected by the UE, by using information representative of at least one available access slot for the uplink preamble and information representative of at least one available signature for the uplink preamble;

an acquisition indicator channel (AICH) generator configured to transmit an acknowledgement (ACK) for the uplink preamble on a response channel to the UE; and an E-DCH/DPCCH detector configured to detect, from the UE, the E-DCH using short E-DCH transmission time intervals (TTIs) or long E-DCH TTIs, and the DPCCH in the time period of the DPCCH, in response to the ACK, wherein the DPCCH reception is started prior to the E-DCH reception, wherein the time period of the DPCCH transmission prior to the E-DCH transmission is determined by:

identifying a first integer value and a second integer value to be used, based on whether the short E-DCH TTIs or the long E-DCH TTIs are used for receiving the E-DCH, determining the time period of the DPCCH transmission prior to the E-DCH transmission is equal to the first integer value times a short E-DCH TTI, when the E-DCH is received using the short E-DCH TTIs, and determining the time period of the DPCCH transmission prior to the E-DCH transmission is equal to the second integer value times a long E-DCH TTI, when the E-DCH is received using the long E-DCH TTIs, wherein the short E-DCH TTI is defined by a first plurality of slots and the long E-DCH TTI is defined by a second plurality of slots, and wherein the second plurality of slots is greater than the first plurality of slots.

14. The apparatus of claim 13, wherein the time period of the DPCCH transmission prior to the E-DCH transmission determined using the short E-DCH TTI is shorter than the time period of the DPCCH transmission prior to the E-DCH transmission determined using the long E-DCH TTI.

15. The apparatus of claim 13, wherein the E-DCH is at least one of a physical layer channel called an E-DCH dedicated physical data channel (E-DPDCH) and a physical layer channel called an E-DCH dedicated physical control channel (E-DPCCH).

16. The apparatus of claim 13, wherein the short E-DCH TTI comprises one sub-frame of three slots and the long E-DCH TTI comprises five sub-frames.

* * * * *

UNITED STATES PATENT AND TRADEMARK OFFICE
CERTIFICATE OF CORRECTION

PATENT NO. : 10,051,658 B2
APPLICATION NO. : 12/349882
DATED : August 14, 2018
INVENTOR(S) : Young-Bum Kim et al.

Page 1 of 1

It is certified that error appears in the above-identified patent and that said Letters Patent is hereby corrected as shown below:

In the Claims

In Column 13, Claim 5, Line 13:
"uplink preamble, the selected access slot and signature;"
Should be:
-- uplink preamble, based on the selected access slot and signature; --

Signed and Sealed this
Twenty-eighth Day of May, 2019

Andrei Iancu
*Director of the United States Patent and Trademark Office*